(12) United States Patent
Schmid

(10) Patent No.: US 9,748,808 B2
(45) Date of Patent: Aug. 29, 2017

(54) CONNECTION OF ROTOR CORE ASSEMBLY AND ROTOR SHAFT AT AN ELECTRICAL MACHINE

(71) Applicant: NIDEC MOTORS & ACTUATORS, Bietigheim-Bissingen (DE)

(72) Inventor: Juergen Schmid, Lauffen (DE)

(73) Assignee: NIDEC Motors & Actuators (Germany) GmbH, Bietigheim-Bissingen (DE)

(*) Notice: Subject to any disclaimer, the term of this patent is extended or adjusted under 35 U.S.C. 154(b) by 844 days.

(21) Appl. No.: 14/135,635

(22) Filed: Dec. 20, 2013

(65) Prior Publication Data

US 2015/0180293 A1    Jun. 25, 2015

(51) Int. Cl.
*H02K 1/32*  (2006.01)
*H02K 1/28*  (2006.01)

(52) U.S. Cl.
CPC ............ *H02K 1/28* (2013.01); *H02K 1/32* (2013.01)

(58) Field of Classification Search
CPC  H02K 1/24; H02K 1/246; H02K 1/02; H02K 1/06
USPC ............... 310/216.004, 216.015–216.018
See application file for complete search history.

(56) References Cited

U.S. PATENT DOCUMENTS

| 6,069,432 | A  | 5/2000 | Norell |
| 6,177,749 | B1 | 1/2001 | Hussey |
| 6,720,702 | B2 | 4/2004 | Knauff |
| 2006/0138877 | A1 | 6/2006 | Akabane |
| 2008/0001496 | A1 | 1/2008 | Lau |
| 2010/0187944 | A1* | 7/2010 | Ossenkopp .............. H02K 1/28 310/216.049 |

FOREIGN PATENT DOCUMENTS

| AT | 171892 B | 7/1952 |
| DE | 3435508 A1 | 4/1986 |
| DE | 9401565.1 U1 | 12/1994 |
| DE | 69507996 T2 | 3/1999 |
| DE | 102007000213 A1 | 10/2008 |

* cited by examiner

*Primary Examiner* — Terrance Kenerly
(74) *Attorney, Agent, or Firm* — 24IP Law Group; Timothy R. DeWitt

(57) ABSTRACT

A rotor core (100, 110) for an electrical motor with a rotational axis (6) and a central opening (200) to take up a shaft (4) of the electrical motor turning around the rotational axis (6), with the central opening (200) having a peripheral edge (201) with at least one attachment section (242), designed for attachment of the rotor core to the shaft by press fit, and at least one centering section (244), wherein the at least one centering section (244) and the at least one attachment section (242) are placed in different sections of the peripheral edge (201) in the circumferential direction (tangentially).

12 Claims, 3 Drawing Sheets

CONNECTION OF ROTOR CORE ASSEMBLY AND ROTOR SHAFT AT AN ELECTRICAL MACHINE

CROSS-REFERENCE TO RELATED APPLICATIONS

None.

BACKGROUND OF THE INVENTION

Field of the Invention

The invention relates to rotors or rotor cores for electrical motors. Specifically, the invention relates to the geometry of rotor core assemblies and their placement or attachment at the shaft of an electrical motor.

Brief Description of the Related Art

Rotors of electrical motors usually have a rotor core assembly that is attached to the shaft of the electrical motor rotating-resistantly and permanently. In addition to other attachment methods, the rotor core is frequently attached to the shaft with a press fit.

The rotor core as such, which comprises permanent or electromagnets and possibly the corresponding coils, frequently comprises of a package of sheets that are pressed or glued to each other. The individual sheets are usually produced by punching and subsequently aligned with each other and packetized.

For durability and reliability of the electrical motors, it is essential that the rotor core is attached to the shaft permanently and fixedly. In addition to procedurally elaborate bonding or other attachment methods, pressing is frequently used for manufacture-technical reasons and the rotor core is thus attached to the shaft by press fit.

To improve the fit of the rotor core assembly on the shaft, it is known from U.S. Pat. No. 6,720,702 to provide a groove in the shaft and the rotor core assembly into which a guide element is inserted. This warrants rotationally safe attachment, which, however, requires an additional production step. In addition to this, use of the attachment pin in one side of the shaft causes an imbalance when turning the electrical motor.

From U.S. Pat. No. 6,069,432, it is known to provide for a sleeve between the rotor core and the shaft that warrants secure fit of the rotor core on the shaft. The sleeve has an inner diameter that essentially corresponds to the outer diameter of the shaft and an outer diameter that essentially corresponds to the inner diameter of the rotor core. Additionally, the cross-section of the sleeve is not perfectly circular at its inner diameter but has several narrower points that ensure a tight press fit when pushing the sleeve onto the shaft. The deformation of the sleeve when attaching it to the shaft deforms it to achieve tight fit on the rotor core assembly. This procedure is rather elaborate and requires use of a special sleeve.

SUMMARY OF THE INVENTION

An object of the invention is to improve attachment of the rotor core to the shaft.

This invention discloses an optimized rotor core or optimized rotor core assembly for an electrical motor. The rotor core has a rotational axis and central opening around this rotational axis with which the rotor core can be placed on a shaft of the electrical motor. The central opening is centered about the rotational axis. The central opening has a peripheral edge with at least one attachment section and at least one centering section. The attachment section and the centering section are each designed to interact with the shaft of the electrical motor when the rotor core is placed on the shaft. The at least one centering section and the at least one attachment section are placed on different sections of the peripheral edge in the circumferential direction. The centering section and the attachment section are separated from each other in tangential direction, i.e. in circumferential direction, and separately formed as separate elements or areas of the peripheral edge. It follows that the peripheral edge does not have an even radius but that the radius of the peripheral edge varies in different angular directions or in the circumferential direction. The variation of the radius may repeat periodically.

The separate formation of the centering sections and the attachment sections has the benefit that the centering or the press fit of the rotor core assemblies on the shaft can be set by the corresponding choice and radius of the attachment sections and the centering sections independently from each other. For example, increase of the press fit can be achieved by choosing a slightly smaller radius of the attachment sections than the radius of the centering sections. Additionally or alternatively, the shape of the attachment sections may be selected independently of the shape of the centering sections. Concentricity of the rotor core on the shaft thus is independent of the attachment and the attachment force can be increased without influencing concentricity.

It can be intended to provide at least three attachment sections at the peripheral edge to warrant a good press fit. The at least three attachment sections can be placed at an even distance from each other in the circumferential direction.

It may also be intended that three or more centering sections are placed along the peripheral edge at even distances in tangential or circumferential direction. At least three centering sections ensure good concentricity and thus a low imbalance of the rotor core assemblies.

While at least three centering sections and at least three attachment sections offer good results, more than three centering sections and more than three attachment sections may, of course, be used.

The rotor core assembly may be formed as a single piece. The rotor core assembly may, however, be made up of a multitude of rotor laminations. In this case, each of the rotor laminations may have at least one attachment section and at least one centering section. However, it may also be intended that a first rotor lamination only has the attachment sections, while a second rotor lamination only has the centering sections. The first rotor laminations and the second rotor laminations can then be placed alternatingly or at any other rhythm to each other.

It is also possible to twist the individual rotor laminations or the peripheral edges with the attachment and centering sections to each other, i.e. placing them offset against each other in the angle direction or tangential or circumferential directions of the shaft. This permits axial swerving of the material, and specifically of the attachment sections, so that it can be varied and adjusted with the force of the press fit. Furthermore, any form of an air channel between the shaft and rotor core can be achieved by providing sections around the peripheral area that have a radius that is much larger than the radius of the shaft. This creates a gap between the shaft and rotor core assembly.

The invention further discloses a rotor and an electrical motor or electromotor that comprises a corresponding rotor core placed on a shaft.

BRIEF DESCRIPTION OF THE DRAWINGS

This invention becomes more obvious when reading the following detailed descriptions of some examples as part of the disclosure under consideration of the enclosed drawings, in which.

DETAILED DESCRIPTION

The object of the present invention is fully described below using examples for the purpose of disclosure, without limiting the disclosure to the examples. The examples present different aspects of the present invention. To implement the present technical teaching, it is not required to implement all of these aspects combined. Rather, a specialist will select and combine those aspects that appear sensible and required for the corresponding application and implementation.

Figure 1A:
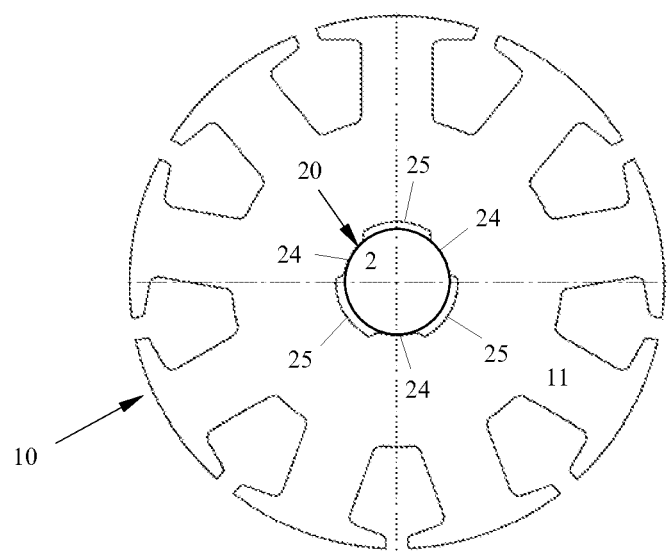
FIGS. 1A and 1B show the inner geometry of a rotor lamination or rotor core assembly according to the state of the prior art.

FIG. 1A shows a common rotor core 10 or a single sheet 11 of a rotor core assembly in axial top view in a prior art. The rotor core 10 may comprise of several rotor sheets or laminations 11 placed in sequence or it may be formed of one piece. A multitude of rotor sheets or laminations may be laminated together in the common manner and form the rotor core 10 as the rotor core assembly. The rotor core 10 has a central opening or cut-out 2 that is designed for rotating-resistant placement of the rotor core 10 on a shaft (not illustrated). The cut-out or opening 2 is centered in the middle in the axial direction of the rotor core 10, so that the rotor core can turn with the shaft with the smallest imbalance. The cut-out or central opening 2 has a peripheral edge or inner geometry 20 in the case presented, with a smaller inner radius 24 for attachment and concentricity of the rotor core on the shaft and a larger radius 25. The smaller inner radius 24 essentially corresponds to the outer radius of the shaft or is slightly smaller and at the same time serves attachment and centering of the rotor core 10 on the shaft. By using the smaller inner radius 24 with slightly smaller radius, a press fit on the shaft can be achieved.

The sections with a larger radius 25 form a groove that may be used, e.g., for cooling.

In addition to the presented inner geometry 20 of the central opening 2, the rotor core 10 may have the features common for an electrical motor, such as a multitude of teeth. The rotor core may have permanent or electromagnets and the corresponding number of coils. The number of teeth and any further rotor core-typical features may correspond to the state of the art.

Figure 1B:
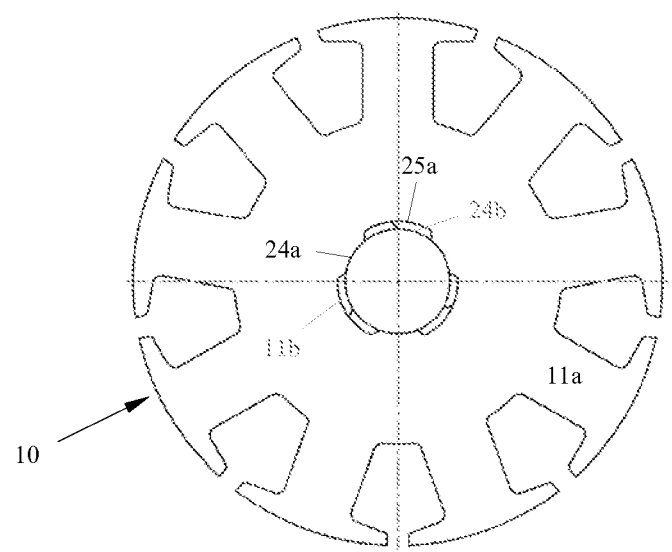

FIG. 1B shows a rotor core 10 according to FIG. 1A that is assembled from several rotor laminations 11, 11a, 11b. In contrast to the illustration of FIG. 1A, FIG. 1b shows the inner geometries of two subsequent rotor laminations 11a, 11b that are offset against each other in angle direction. The placements of the teeth and the other elements of the rotor laminations are aligned with each other. This leads to an offset placement of the centering and attachment sections 24a, 24b of the first rotor laminations 11a and of the second rotor laminations 11b. This enables, e.g., a variation of the air channels formed by the openings 25a. The press fit can also be set to a certain amount.

Figure 2A:
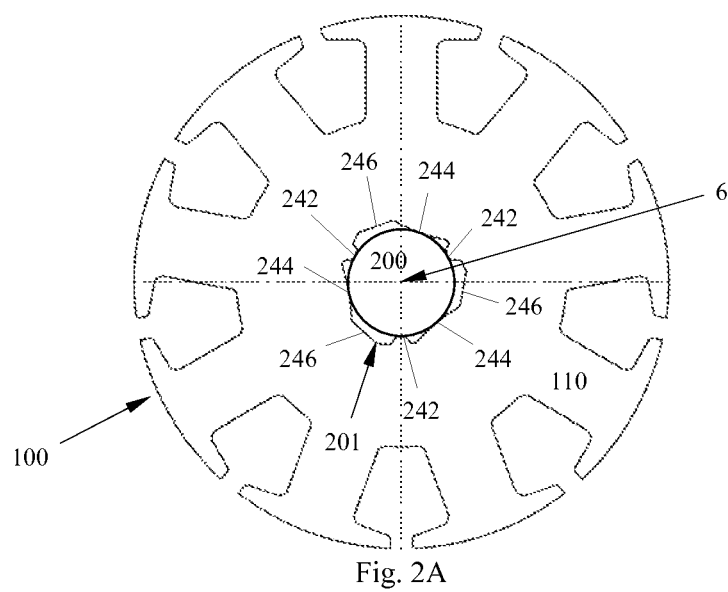
FIGS. 2A and 2B show the possible inner geometry of a rotor lamination or rotor core assembly according to the first embodiment of this invention.
Figure 2B:
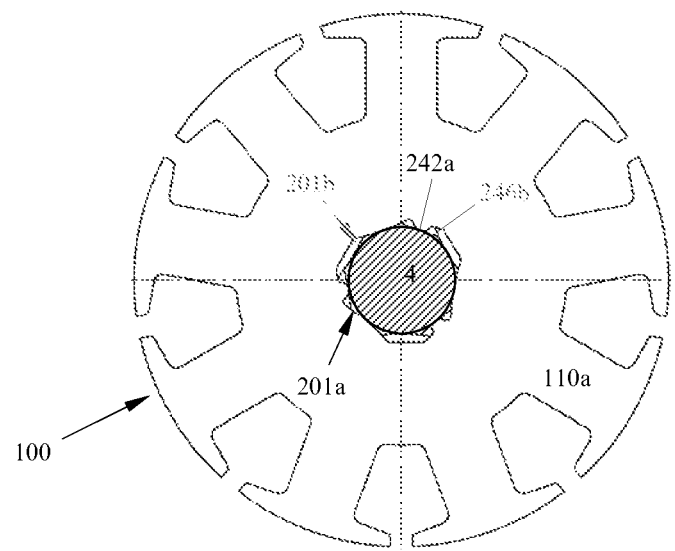

FIGS. 2A and 2B show a modified rotor core 100 according to the present invention. The rotor core 100 corresponds to the rotor core 10 in FIGS. 1A and 1B in all elements and merely differs in the shape and design of the central opening or cut-out 200. The other elements of the rotor core 100 correspond to common rotor cores, particularly regarding placement of the permanent or electromagnets, the number, placement and shape of the teeth. The rotor core 100 can also be formed from one piece or from a multitude of subsequent rotor laminations 110. The rotor laminations 110 are usually packetized according to the state of the art to form the rotor core assembly 100.

FIG. 2A shows a top view in the axial direction of the rotor core of a single rotor lamination 110. When using identical rotor laminations or a single-piece rotor core, FIG. 2A also corresponds to the top view of a rotor core. The cut-out or central opening 200 of the rotor laminations 110 has a peripheral edge or an inner geometry 201 that are rotationally symmetric around the rotational axis 6 and structured in different sections. In the example shown, the peripheral edge 201 has three different sections that cyclically repeat in the circumferential direction, i.e. tangentially to the peripheral edge 201, three times. The sections comprise three attachment sections 242, three centering sections 244 and three groove sections 246.

The three attachment sections 242 are placed at an even distance to each other in the circumferential direction along the peripheral section 201, i.e. at an angle of about 120° to each other. The attachment sections 242 have an attachment radius, i.e. the smallest distance between the rotational axis 6 and the attachment section 242, with the attachment radius essentially corresponding to the radius of the shaft 4 or being slightly smaller. The attachment radius of the attachment sections 242 is chosen so that a predetermined press fit with the shaft is achieved when the rotor core 100 is placed on the shaft 4. The strength of the press fit may be set by the choice of the attachment radius.

Additionally or alternatively, the press fit may also be determined and set by the shape of the attachment sections. The shape of the attachment sections may be curved with a consistent or variable curve as shown in FIG. 2A.

The peripheral edge or the inner geometry 201 not only has the attachment sections 242, but also three centering sections 244. The three centering sections 244 are also placed at even distances along the peripheral edge 201, i.e. in case of three centering sections at an angle of about 120° to each other. The centering sections 244 have a centering radius, i.e. the smallest distance between the rotational axis 6 and the centering section 244, with the centering radius essentially corresponding to the radius of the shaft 4. The centering sections 244 interact to align the rotor core 100 regarding the shaft 4 and to center it so that the most concentric movement possible, free of any imbalance, is achieved. For this, the centering sections 244 have the shape of an essentially straight tangent in the illustrated examples, with this tangent applied to the shaft. This permits particularly good concentricity, because with this shape the centering sections 244 will not bend easily, which will reduce the inaccuracy. Good concentricity can be achieved particularly with the number of three centering sections 244. However, other shapes of the centering sections are possible as well, specifically concave or convex curves.

Use of different and separated areas of the peripheral edge 201 for the centering sections 244 and the attachment sections or clamping sections 242 permits different designs for them both in radius and regarding their geometry or shape. The centering sections 244 can be optimized, e.g. by the described tangential shape, for concentricity without requiring any consideration for their attachment and clamping properties regarding tight press-fit of the rotor core. The fit of the rotor core 200 on the shaft 4 is ensured by the clamping or attachment sections 242 that are specifically formed and may have, e.g., a convexly curved area. Together with the adjustment of the radius to the attachment, the attachments or clamping sections 242 may be designed so that the desired press fit on the shaft 4 is achieved without requiring consideration of the shape in respect of centering properties.

While the illustrated example has three centering sections 244 and attachment or clamping sections 242 each, it is understood that this disclosure is not limited to this number. While the number of three evenly spaced centering sections permits a good and simple concentricity of the rotor cores, it is generally also possible to use any other number of centering sections in excess of three. In addition to the attachment sections 242 and the centering sections 244, a channel or groove section 246 is intended for as well, which is also placed threefold at even distances in the tangential direction around the peripheral edge 201 in the examples illustrated in FIGS. 2A and 2B. Therefore, each centering section 244 is adjacent to an attachment section 242 and a groove section 266, and each centering section 244 faces a groove section in 200° over the rotational axis. And as shown in FIG. 2A, the groove section 246 extends in the circumferential direction for a certain angle, so the centering section 244 is still facing a portion of the groove section 246 in 180° over the rotational axis. The channel or groove sections 246 create a groove or channel between the shaft 4 and rotor core 100 in which there is no interaction between the shaft and rotor core. And in FIG. 2A, it can be observed that the radius of the centering section 244 is smaller than that of the groove section 246, and the radius increases gradually from the centering section 244 to the groove section 246. In this way, the centering section 244 can form the straight shape which is tangent to the outer circumference of the shaft. And the strength of the centering section 244 can be secured.

Figure 3:
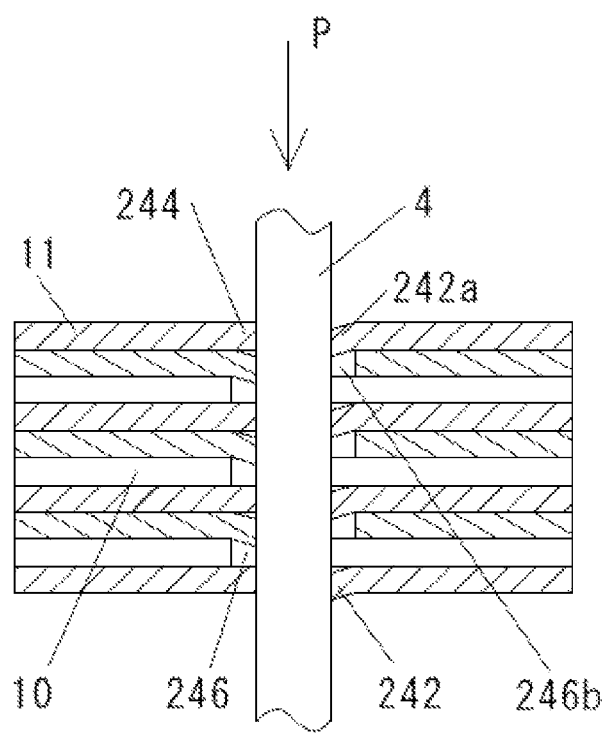
FIG. 3 shows a section view of the assembly of rotor core and shaft according to the first embodiment of this invention.

FIG. 2B shows the rotor core of FIG. 2A comprising of not only a single unit or a single sheet 110, but several subsequent rotor laminations 110a, 110b. Similar to the example shown in FIG. 1B, the inner geometries or the peripheral edges 201a, 201b are placed offset against each other in the tangential or circumferential directions. Because the outer shape and specifically the placement of the teeth remains aligned to each other, the offset angle of two lamination is n*360°/S (n: integer; S: slot number). In the embodiment of FIG. 2B, the offset angle is 40. Because the three attachment sections 242, the three centering sections 244 and the three groove sections 246 are all arranged evenly to each other, the angle between each section is 40. The inner geometry can thus be aligned so that a groove section 246b of a second rotor lamination is placed next to an attachment section of a first rotor lamination 110a. This enables the clamping or attachment section 242a of the first rotor lamination to evade, or bend in the axial direction when the rotor core is pressed onto the shaft 4. The sectional view of the attachment section 242a can be confirmed in FIG. 3. In FIG. 3, each attachment section 242a bends downwards into the groove section 246b arranged below it. Not just attachment section 242a, attachment section 242 of other laminations all bend downwards into groove section 246 arranged below them. And in FIG. 3, the shaft 4 is pressed into the rotor core 11 in the direction P, which causes the bending of attachment section 242. And in a rotor assembly shown in FIG. 3, shaft 4 can only be pressed into rotor core in direction P. This axial flexibility of the attachment section 242 also permits better adjustment and better definition of the press fit. This is a benefit specifically since the individual rotor laminations 110, 110a, 110b are frequently produced in the punching procedure, which achieves a limited production accuracy. Therefore, the tolerances may be a bit more generous in this case while still achieving a good and pre-defined press fit.

Furthermore, there is the option of not placing all three sections, attachment section 242, centering section 244 and groove section 246, at a single rotor lamination 110a, 110b as shown in FIG. 2B. It is also possible to equip certain rotor laminations only with the centering sections 244 and other rotor laminations only with the attachment sections 242. The corresponding layering of the rotor laminations with attachment sections and the rotor laminations with centering sections permits placing them so that a setup similar to FIG. 2A results and the entire rotor core is also well-centered while the pre-defined press fit is achieved.

It is also possible to apply a different number of sheets with centering sections and attachment sections. Furthermore, the groove sections 246 may be provided for in separate sheets or in sheets with centering and/or attachment sections.

In any case, the separate design of the centering sections from the attachment sections with different geometry permits concentricity of the rotor core on the shaft independently of its fit and attachment to the shaft, so that both the concentricity and the press fit can be improved independently of each other.

A specialist will modify the examples shown here accordingly and particularly adjust the geometry of the centering sections 244 and the attachment or clamping sections 242 or the groove section 246 to the respective conditions. Furthermore, it is, of course, also possible to entirely dispense with the groove section 246. In addition to the illustrated examples, other geometries may be used for the centering section and other geometries may be used for the attachment section. It is also possible to use different numbers of attachment sections and centering sections.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A rotor core for an electrical motor rotating with a rotational axis includes a central opening to take up a shaft of the electrical motor rotating around the rotational axis, with the central opening having a peripheral edge with at least:
    one attachment section, designed for attachment of the rotor core on the shaft by press fit, with the at least one attachment section forming a protrusion towards the rotational axis at the peripheral edge; and one centering section; wherein
the at least one centering section and the at least one attachment section are placed in different sections of the peripheral edge in circumferential direction, with the at least one centering section being formed as a section of the peripheral edge that is essentially tangential to the outer diameter of the shaft with an attachment radius of the attachment section being essentially the same as a centering radius of the centering section, wherein the attachment radius corresponds to a smallest distance between the rotational axis and the attachment section and the centering radius corresponds to a smallest distance between the rotational axis and the centering section.

2. The rotor core according to claim 1, comprising at least three attachment sections, with the at least three attachment sections being evenly spaced along the peripheral edge in circumferential direction.

3. The rotor core according to claim 1, comprising at least three centering sections, with the at least three centering sections placed evenly spaced along the peripheral edge in circumferential direction.

4. The rotor core according to claim 1, with the peripheral edge also comprising at least one groove section that has a higher radius as compared to the rotating axis than the at least one attachment section and the at least one centering section.

5. The rotor core according to claim 4, the radius increases gradually from the centering section to the groove section.

6. The rotor core according to claim 4, the at least one centering section faces a portion of the at least one groove section in 180° over the rotational axis.

7. The rotor core according to claim 1, with the rotor core includes a plurality of layered sheets.

8. The rotor core according to claim 7, with the multitude of layered sheets comprising at least a first sheet that has the at least one attachment section and at least a second sheet that has the at least one centering section.

9. The rotor core according to claim 7, with the multitude of layered sheets comprising at least a first sheet that has the at least one attachment section and the at least one centering section.

10. The rotor core according to claim 7, with at least two of the multitude of layered sheets being placed offset against each other in circumferential direction.

11. The rotor core according to claim 7, each of the plurality of layered sheets includes the at least one attachment section, the at least one centering section and the at least one groove section, and sheets adjacent to each other are offset in an angle of n*360°/S (n: integer; S: slot number), wherein the at least one attachment section of each plate bends at the same direction into the at least one groove section of the adjacent plate.

12. A producing method of a rotor assembly comprising a shaft and the rotor core according to claim 11, the shaft is pressed into the central opening of the rotor core in the direction which the at least one attachment section of each plate bends.

* * * * *